(12) United States Patent
Matsuda (10) Patent No.: US 11,750,011 B2
(45) Date of Patent: *Sep. 5, 2023

(54) CHARGE AND DISCHARGE CONTROL APPARATUS AND ELECTRONIC DEVICE

(71) Applicant: SEIKO EPSON CORPORATION, Tokyo (JP)

(72) Inventor: Kinya Matsuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 67 days.

This patent is subject to a terminal disclaimer.

(21) Appl. No.: 17/185,165

(22) Filed: Feb. 25, 2021

(65) Prior Publication Data

US 2021/0273472 A1    Sep. 2, 2021

(30) Foreign Application Priority Data

Feb. 28, 2020   (JP) ................................. 2020-033142

(51) Int. Cl.
  *H02J 7/00*   (2006.01)
  *H04R 1/10*   (2006.01)

(52) U.S. Cl.
  CPC ....... *H02J 7/00712* (2020.01); *H02J 2207/20* (2020.01); *H04R 1/1016* (2013.01); *H04R 1/1025* (2013.01)

(58) Field of Classification Search
  CPC .................................................. H02J 7/00712
  USPC ...................................................... 320/128
  See application file for complete search history.

(56) References Cited

U.S. PATENT DOCUMENTS

| 2003/0193318 | A1* | 10/2003 | Ozawa | H02J 7/0048 320/132 |
| 2009/0112496 | A1* | 4/2009 | Suzuki | H02J 7/00302 702/63 |
| 2012/0098337 | A1 | 4/2012 | Sasaki | |
| 2015/0180242 | A1* | 6/2015 | Kono | H02J 7/1469 320/134 |
| 2020/0047634 | A1* | 2/2020 | Akaishi | B60L 53/62 |
| 2020/0241379 | A1* | 7/2020 | Barnum | G09G 3/19 |

FOREIGN PATENT DOCUMENTS

| JP | 6-153420 | 5/1994 |
| JP | 6-253471 | 9/1994 |
| JP | 2008-301607 | 12/2008 |
| JP | 2012-090498 | 5/2012 |
| JP | 2016-194841 | 11/2016 |

* cited by examiner

*Primary Examiner* — Yalkew Fantu
(74) *Attorney, Agent, or Firm* — Rankin, Hill & Clark LLP (57) ABSTRACT

Provided is a charge and discharge control apparatus including: a first power supply circuit configured to supply power to a power supply target based on received power; a charging circuit configured to charge a charging target based on received power; a second power supply circuit configured to supply power to the power supply target based on discharge power output from the charging target; and a control unit configured to control operations of the first power supply circuit and the second power supply circuit, wherein when a voltage of the charging target is lower than a predetermined value, the control unit causes the first power supply circuit to supply power to the power supply target.

6 Claims, 5 Drawing Sheets

CHARGE AND DISCHARGE CONTROL APPARATUS AND ELECTRONIC DEVICE

The present application is based on, and claims priority from JP Application Serial Number 2020-033142, filed Feb. 28, 2020, the disclosure of which is hereby incorporated by reference herein in its entirety.

BACKGROUND

1. Technical Field

The present disclosure relates to a charge and discharge control apparatus and an electronic device.

2. Related Art

JP-A-2016-194841 discloses a USB fan apparatus using a USB power supply, and the USB fan apparatus includes: a motor for driving a fan; a fan drive circuit for driving the motor; a rechargeable battery for supplying power to the motor when not coupled to the USB power supply; a microcomputer for controlling output of power to the fan drive circuit; a charging system control circuit for controlling output of current from the USB power source to the rechargeable battery; and a power supply switching circuit. Among these components, the power supply switching circuit selectively switches the current supplied from the USB power source and the current supplied from the rechargeable battery, and distributes and outputs the current to the microcomputer or the charging system control circuit.

In such a USB fan apparatus, it is possible to select which of the USB power supply and the rechargeable battery is used as the power supply, which is highly convenient.

JP-A-2016-194841 is an example of the related art.

In the USB fan apparatus disclosed in JP-A-2016-194841, when the rechargeable battery is in an over-discharged state, even if the USB power supply is coupled, the power switching circuit does not operate, and the power supply may not be switched. In this case, a current cannot flow through the microcomputer and the charging system control circuit, and the USB fan device is not activated.

SUMMARY

A charge and discharge control apparatus according to an application example of the present disclosure includes: a first power supply circuit configured to supply power to a power supply target based on received power; a charging circuit configured to charge a charging target based on received power; a second power supply circuit configured to supply power to the power supply target based on discharge power output from the charging target; and a control unit configured to control operations of the first power supply circuit and the second power supply circuit, wherein when a voltage of the charging target is lower than a predetermined value, the control unit causes the first power supply circuit to supply power to the power supply target.

An electronic device according to the application example of the present disclosure includes: a charge and discharge control apparatus according to the application example of the present disclosure.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a preferred embodiment of a charge and discharge control apparatus and an electronic device according to the present disclosure will be described in detail with reference to the accompanying drawings.

1. Electronic Device

Figure 1:
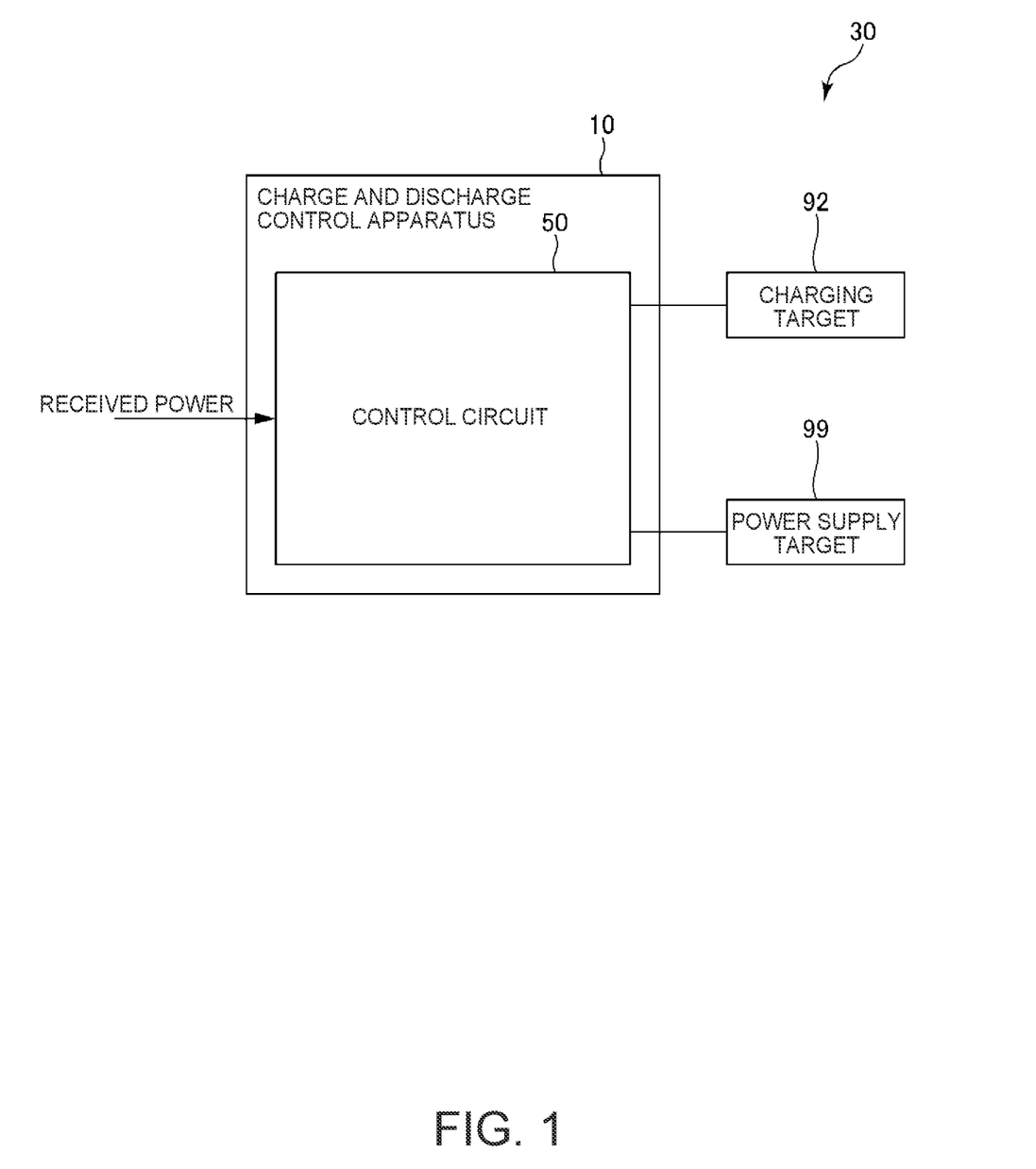
FIG. 1 is a block diagram showing a configuration of an electronic device according to an embodiment.
Figure 2:
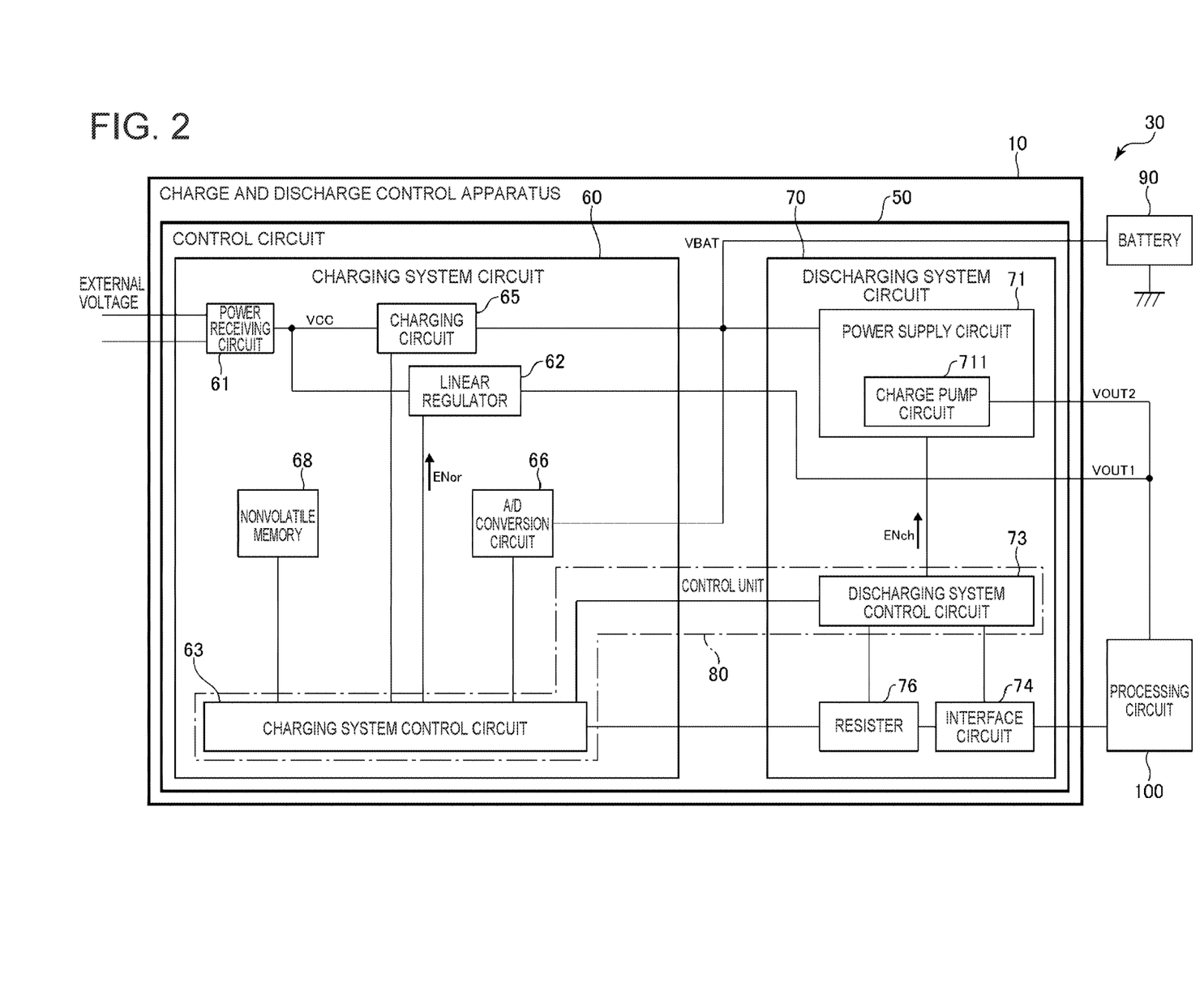
FIG. 2 is a block diagram showing a detailed configuration of the electronic device shown in FIG. 1.

FIG. 1 is a block diagram showing a configuration of an electronic device according to an embodiment. FIG. 2 is a block diagram showing a detailed configuration of the electronic device shown in FIG. 1.

An electronic device 30 shown in FIG. 1 includes a charge and discharge control apparatus 10 including a control circuit 50, a power supply target 99, and a charging target 92.

The power supply target 99 is a device to which the control circuit 50 supplies power, and is, for example, a processing circuit 100 shown in FIG. 2.

The charging target 92 is a device to be charged by the control circuit 50, and is, for example, a battery 90 shown in FIG. 2.

The control circuit 50 performs constant current charging, constant voltage charging, or the like of the charging target 92 based on the received power, and supplies power to the power supply target 99 based on received power or discharge power from the charging target 92.

The control circuit 50 may also be configured to receive power by contact-type power transmission via a wired power supply line, or may also be configured to receive power by contactless power transmission.

The processing circuit 100 controls the operation of the control circuit 50. Specifically, the processing circuit 100 executes various control processes for controlling the control circuit 50. The processing circuit 100 controls the operation of the control circuit 50 by, for example, issuing a command to the control circuit 50, or setting various types of information to the control circuit 50. The processing circuit 100 is realized by a processor such as a DSP (Digital Signal Processor), a CPU (Central Processing Unit), an ASIC, or a microcontroller. The processing circuit 100 may also perform various digital signal processing such as audio processing and image processing.

The battery 90 is, for example, a rechargeable secondary battery. Examples of the secondary battery include a lithium secondary battery such as a lithium ion secondary battery and a lithium ion polymer secondary battery, and a nickel secondary battery such as a nickel-hydrogen secondary battery and a nickel-cadmium secondary battery.

2. Charge and Discharge Control Apparatus According to First Embodiment

2.1 Configuration of Charge and Discharge Control Apparatus

The control circuit 50 included in the charge and discharge control apparatus 10 shown in FIG. 2 includes a charging system circuit 60 and a discharging system circuit 70.

Among these components, the charging system circuit 60 includes a power receiving circuit 61, a charging circuit 65, a linear regulator 62, a charging system control circuit 63, an A/D conversion circuit 66, and a nonvolatile memory 68. The discharging system circuit 70 includes a power supply circuit 71, a discharging system control circuit 73, an interface circuit 74, and a register 76. Hereinafter, each part of the charging system circuit 60 and the discharging system circuit 70 will be described in detail.

The charging system circuit 60 shown in FIG. 2 is a circuit that charges the battery 90, and supplies power to the processing circuit 100 as needed. Specifically, the charging system circuit 60 operates based on received power and charges the battery 90. At the same time, the charging system circuit 60 supplies power to the processing circuit 100 at a predetermined voltage.

The charging system circuit 60 performs, for example, control for charging the battery 90 with a constant current, control for charging the battery 90 with a constant voltage, and the like. Specifically, the charging system circuit 60 first performs constant current charging of the battery 90, and then switches from constant current charging to constant voltage charging when the charging voltage of the battery 90 reaches a predetermined voltage.

In the constant current charging, the battery 90 is charged with a constant charging current at which the current is constant, and in the constant voltage charging, the battery 90 is charged with a constant charging voltage at which the voltage is constant. By performing constant current charging, the charging voltage of the charging target can be increased in a short time. Because the charging current gradually decreases by performing constant voltage charging, a rapid change in the charging current is suppressed, and the current value and the voltage value of the charging are stabilized. The charging current in the constant current charging does not need to be completely constant and may be substantially constant, and the charging voltage in the constant voltage charging does not need to be completely constant and may be substantially constant.

The power receiving circuit 61 converts, for example, an AC external voltage into a DC rectified voltage VCC and outputs the DC rectified voltage VCC. The charging circuit 65 has a function of receiving the rectified voltage VCC, operating based on the rectified voltage VCC, and charging the battery 90. Specifically, the charging circuit 65 charges the battery 90 by constant current charging or constant voltage charging based on the rectified voltage VCC.

The linear regulator 62 has a function of receiving the rectified voltage VCC, operating based on the rectified voltage VCC, and supplying power to the processing circuit 100. Specifically, the linear regulator 62 steps down the rectified voltage VCC, generates a predetermined output voltage VOUT1, and supplies the output voltage VOUT1 to the processing circuit 100. The linear regulator 62 is realized by, for example, an analog regulator such as an LDO (Low Dropout) regulator.

The charging system control circuit 63 controls the operation of the charging circuit 65 to charge the battery 90, and controls the operation of the linear regulator 62 to supply power to the processing circuit 100. The charging system control circuit 63 also controls the operations of the interface circuit 74 and the register 76. The charging system control circuit 63 controls, for example, interface processing of the interface circuit 74, and controls writing and reading of information to and from the register 76. Specifically, the charging system control circuit 63 reads information from the register 76, and controls the operation of the charging circuit 65.

The A/D conversion circuit 66 performs, for example, A/D conversion of the battery voltage VBAT of the battery 90, and outputs the converted value to the charging system control circuit 63 and the like.

The nonvolatile memory 68 is realized by, for example, an EEPROM (Electrically Erasable Programmable Read-Only Memory) capable of electrically erasing data, an OTP (One Time Programmable) memory using an FAMOS (Floating gate Avalanche injection MOS), or the like. In FIG. 2, the nonvolatile memory 68 is provided in the control circuit 50, but the nonvolatile memory 68 may also be provided outside the control circuit 50.

The discharging system circuit 70 shown in FIG. 2 is a circuit that performs a discharge operation of the battery 90, and supplies discharge power to the processing circuit 100. Specifically, the discharging system circuit 70 operates based on the battery voltage VBAT of the battery 90, and supplies an output voltage VOUT2 to the processing circuit 100. Accordingly, the processing circuit 100 operates based on the output voltage VOUT2.

The power supply circuit 71 supplies the output voltage VOUT2 based on the battery voltage VBAT to the processing circuit 100. The power supply circuit 71 shown in FIG. 2 includes a charge pump circuit 711. The charge pump circuit 711 performs a charge pump operation of stepping down the battery voltage VBAT, and generates the output voltage VOUT2. Then, the charge pump circuit 711 supplies the generated output voltage VOUT2 to the processing circuit 100.

The charge pump circuit 711 is realized by, for example, a DC-DC converter, specifically, a switching regulator. Instead of the charge pump circuit 711, a linear regulator, for example, an analog regulator may also be used.

The discharging system control circuit 73 controls the operation of the power supply circuit 71 to generate and output the output voltage VOUT2 based on the battery voltage VBAT. The discharging system control circuit 73 controls also the operations of the interface circuit 74 and the register 76. The discharging system control circuit 73 controls interface processing of the interface circuit 74, and controls writing and reading of information to and from the register 76, for example.

The above-described charging system control circuit 63 and the discharging system control circuit 73 constitute a control unit 80. That is to say, the control unit 80 includes a circuit (e.g., a charging system control circuit 63) that operates with power from the power receiving circuit 61 and controls the operations of the charging circuit 65 and the linear regulator 62, and a circuit (e.g., a discharging system control circuit 73) that operates with power from the battery 90 and controls the operation of the power supply circuit 71 including the charge pump circuit 711.

The interface circuit 74 is a circuit that performs interface processing with the processing circuit 100. The interface circuit 74 performs, for example, interface processing of receiving a command issued by the processing circuit 100 or receiving information set by the processing circuit 100. The interface circuit 74 is realized by, for example, a serial interface circuit such as an SPI (Serial Peripheral Interface) or an I2C (Inter-Integrated Circuit). The interface circuit 74 may also be, for example, a serial interface circuit or a parallel interface circuit using differential signals.

Various types of information are written to the register 76 by the processing circuit 100 via the interface circuit 74. The various types of information written in the register 76 are read by the processing circuit 100 via the interface circuit 74.

The register 76 is realized by, for example, a flip-flop circuit, a memory such as a RAM (Random Access Memory), or the like.

Examples of various types of information include a command from the processing circuit 100 and information on current setting.

The interface circuit 74 and the register 76 operate based on either the battery voltage VBAT output from the battery 90 or the output voltage VOUT1 output from the linear regulator 62. Accordingly, the interface circuit 74 and the register 76 can operate when the rectified voltage VCC is received or when the battery 90 can be discharged even when the rectified voltage VCC is not received. As a result, in these states, the processing circuit 100 can write information to the register 76 via the interface circuit 74 or read information stored therein. Also, the register 76 holds the stored information and enables, for example, the charging system control circuit 63 to read the information.

The control circuit 50 receives a current setting from the processing circuit 100. When the processing circuit 100 issues a command for the current setting of the constant current charging or sets information for the current setting of the constant current charging, for example, the control circuit 50 receives the setting of the command or the information. Then, the control circuit 50 performs constant current charging based on the current setting set by the processing circuit 100. Specifically, the control circuit 50 performs constant current charging for charging the battery 90 using a current value corresponding to a current mode as a charging current. Also, when the current setting is a current value, the control circuit 50 performs constant current charging for charging the battery 90 with the set current value as a charging current.

The nonvolatile memory 68 stores a current value corresponding to the current mode. When the current setting includes, for example, a first current mode in which constant current charging is performed with a first current value and a second current mode in which constant current charging is performed with a second current value that is different from the first current value, the nonvolatile memory 68 stores the first current value and the second current value. Then, when a command for setting the first current mode is issued by the processing circuit 100, the charging system control circuit 63 reads the current setting stored in the register 76, and reads the first current value stored in the nonvolatile memory 68 based on the current setting. In this manner, the charging system control circuit 63 controls the operation of the charging circuit 65 to perform constant current charging at the first current value. Also, when a command for setting the second current mode is issued by the processing circuit 100, the charging system control circuit 63 reads the current setting stored in the register 76, and reads the second current value stored in the nonvolatile memory 68 based on the current setting. In this manner, the charging system control circuit 63 controls the operation of the charging circuit 65 to perform constant current charging at the second current value.

In this manner, by charging the battery 90 while using a plurality of current modes having different current values, the charging time can be shortened or the deterioration of the battery 90 can be suppressed in accordance with the environment around the battery 90, the specifications, the type, and the like of the battery 90. As a result, optimum charging according to the state of the battery 90 becomes possible.

The charging system control circuit 63 may also autonomously control the charging current of the constant current charging. In other words, the charging system control circuit 63 may also be configured to autonomously control the operation of the charging circuit 65 based on the A/D conversion value of the battery voltage VBAT.

In the control circuit 50 described above, the supply source of power to the processing circuit 100 is switched between the linear regulator 62 and the charge pump circuit 711 by the operation of the charging system control circuit 63. Specifically, when the charging circuit 65 receives the rectified voltage VCC, the charging system control circuit 63 switches the supply source of power to the processing circuit 100 between the linear regulator 62 that outputs the output voltage VOUT1 and the charge pump circuit 711 that outputs the output voltage VOUT2 in accordance with the battery voltage VBAT. In other words, the control circuit 50 is configured to supply the output voltage VOUT1 obtained by stepping down the rectified voltage VCC to the processing circuit 100 in accordance with the voltage value of the battery voltage VBAT when the charging circuit 65 receives the rectified voltage VCC.

In this manner, the control circuit 50 can supply power to the processing circuit 100 even when the battery 90 is in an over-discharged state. As a result, the processing circuit 100 can perform various processes regardless of the charging state of the battery 90.

When the charging circuit 65 receives the rectified voltage VCC, the control circuit 50 may also operate to supply the output voltage VOUT1 output from the linear regulator 62 to the processing circuit 100 regardless of the state of the battery 90. In this case, it is possible to suppress the noise mixed into the output voltage VOUT1 and to suppress the malfunction of the processing circuit 100 caused by the noise, by utilizing the advantage of the linear regulator 62 that noise is less likely to be generated than the switching regulator.

Examples of the charge and discharge control apparatus 10 described above include a semiconductor IC chip such as an ASIC (Application Specific Integrated Circuit). The IC chip is, for example, a circuit device mounted in a package, for example. The circuit device that realizes the processing circuit 100 is an IC chip different from the IC chip of the charge and discharge control apparatus 10. However, the charge and discharge control apparatus 10 that realizes the control circuit 50 and the circuit device that realizes the processing circuit 100 may also be one IC chip or may also be mounted in one package. The charge and discharge control apparatus 10 may also have a structure in which a plurality of circuit devices are coupled via a wiring substrate or the like. Of the elements included in the control circuit 50, for example, the nonvolatile memory 68, the register 76, and the like may also be provided outside the IC chip including the charging circuit 65 and the power supply circuit 71.

2.2. Operation Example of Charge and Discharge Control Apparatus

Figure 3:
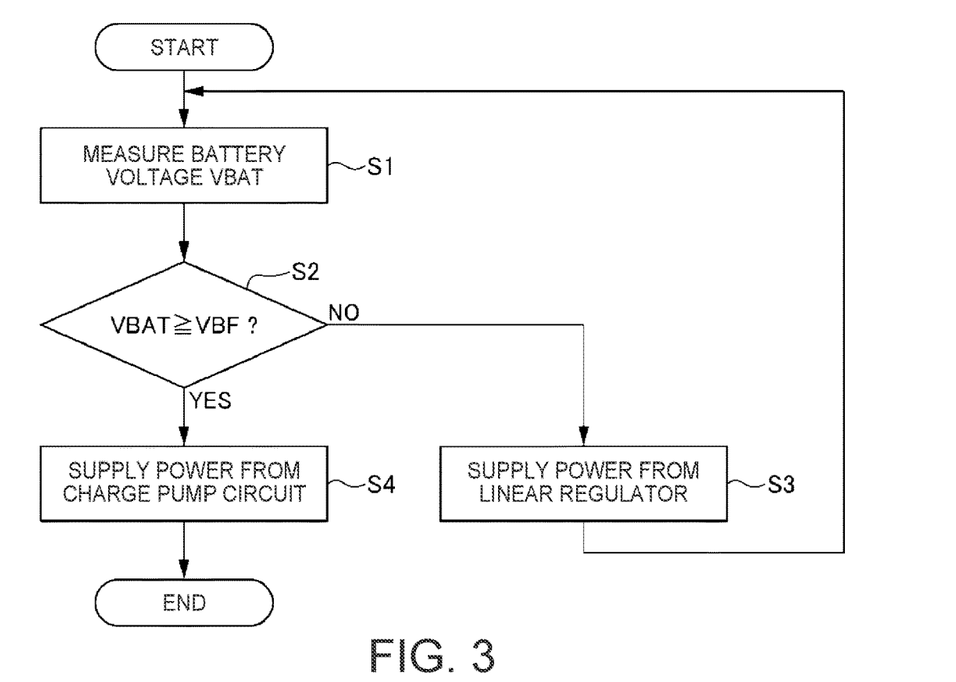
FIG. 3 is a flowchart showing an operation example of a charge and discharge control apparatus according to the embodiment.

FIG. 3 is a flowchart showing an operation example of the charge and discharge control apparatus 10.

When the charging circuit 65 is receiving the rectified voltage VCC, that is to say, when the charge and discharge control apparatus 10 is receiving an external voltage (received power), the control circuit 50 first measures the battery voltage VBAT of the battery 90 in the open state as step S1. Specifically, the A/D conversion circuit 66 performs A/D conversion (analog/digital conversion) of the battery voltage VBAT.

As step S2, the charging system control circuit 63 of the control unit 80 shown in FIG. 2 compares the A/D conversion value of the battery voltage VBAT with a predetermined threshold voltage VBF. When the battery voltage VBAT is lower than the threshold voltage VBF, the charging system control circuit 63 determines that the battery 90 is in an over-discharged state. On the other hand, when the battery voltage VBAT is the threshold voltage VBF or higher, the charging system control circuit 63 determines that the battery 90 is sufficiently charged and in a dischargeable state.

The predetermined threshold voltage VBF can be stored in the nonvolatile memory 68, for example. The threshold voltage VBF is, for example, a lower limit value of the battery voltage VBAT when the battery 90 is in a stable dischargeable state.

Then, when the charging system control circuit 63 determines that the battery voltage VBAT is lower than the threshold voltage VBF, that is to say, the battery 90 is in an over-discharged state, the charging system control circuit 63 activates the control signal ENor for controlling the operation of the linear regulator 62, as step S3. As a result, the linear regulator 62 supplies the output voltage VOUT1 to the processing circuit 100. The output voltage VOUT1 is a voltage obtained by stepping down the rectified voltage VCC.

In this case, the discharging system control circuit 73 of the control unit 80 shown in FIG. 2 deactivates the control signal ENch for controlling the operation of the charge pump circuit 711. Accordingly, the charge pump circuit 711 does not output the battery voltage VBAT/3 (the output voltage VOUT2).

After step S3 ends, the process returns to step S1.

In step S1, the battery voltage VBAT of the battery 90 in an open state is measured again. In step S2, the battery voltage VBAT is compared with the threshold voltage VBF again. At this time, when the battery 90 has been sufficiently charged, the battery voltage VBAT becomes the threshold voltage VBF or higher.

In this case, the discharging system control circuit 73 determines that the battery 90 is in a dischargeable state, and activates the control signal ENch for controlling the operation of the charge pump circuit 711 as step S4. As a result, the power supply circuit 71 supplies the battery voltage VBAT/3 to the processing circuit 100 as the output voltage VOUT2. The battery voltage VBAT/3 is a voltage obtained by stepping down the battery voltage VBAT to about one-third by the charge pump operation of the charge pump circuit 711. The step-down ratio is not particularly limited.

In this case, the charging system control circuit 63 deactivates the control signal ENor for controlling the operation of the linear regulator 62. In this manner, the linear regulator 62 outputs no output voltage VOUT1.

According to the above-described operation example, even when the battery 90 is in an over-discharged state, power can be supplied to the processing circuit 100. As a result, the processing circuit 100 can perform various processes regardless of the charging state of the battery 90.

The above operation example is an example, and the control circuit 50 may also continue to supply the output voltage VOUT1 of the linear regulator 62 to the processing circuit 100 even when the battery 90 reaches a dischargeable state.

As described above, the charge and discharge control apparatus 10 according to the present embodiment includes: the linear regulator 62 (the first power supply circuit) configured to supply power to the processing circuit 100 (the power supply target 99) based on received power; the charging circuit 65 configured to charge the battery 90 (the charging target 92) based on received power; the charge pump circuit 711 (the second power supply circuit) configured to supply power to the processing circuit 100 based on the battery voltage VBAT, which is discharge power output from the battery 90; and the control unit 80 configured to control the operations of the linear regulator 62 and the charge pump circuit 711. Then, when the battery voltage VBAT of the battery 90 is lower than the predetermined threshold voltage VBF (predetermined value), the control unit 80 causes the linear regulator 62 to supply power to the processing circuit 100.

According to such a configuration, the charge and discharge control apparatus 10 can supply power to the processing circuit 100 regardless of the state of the battery 90 when receiving the rectified voltage VCC. Accordingly, for example, even when the battery 90 is in an over-discharged state, power can be supplied to the processing circuit 100, and various processes can be performed by the processing circuit 100.

When the battery voltage VBAT of the battery 90 (the charging target 92) is the threshold voltage VBF (predetermined value) or higher, the control unit 80 preferably causes the charge pump circuit 711 (the second power supply circuit) to supply power to the processing circuit 100 (the power supply target 99).

Because the charge pump circuit 711 is configured by a DC-DC converter such as a switching regulator, for example, power consumption of the charge pump circuit 711 is smaller than that of the linear regulator 62. For this reason, the power consumption of the electronic device 30 can be reduced by supplying power from the charge pump circuit 711 when the battery 90 becomes dischargeable.

As describe above, the charge pump circuit 711 (the second power supply circuit) preferably has high power conversion efficiency than the linear regulator 62 (the first power supply circuit). With this configuration, even when receiving the rectified voltage VCC, the power consumption of the electronic device 30 can be reduced by supplying power from the charge pump circuit 711.

As described above, when the battery voltage VBAT of the battery 90 (the charging target 92) changes from lower than the predetermined threshold voltage VBF (predetermined value) to the threshold voltage VBF (predetermined value) or higher, the control unit 80 switches the supply source of power to the processing circuit 100 (the power supply target 99) from the linear regulator 62 to the charge pump circuit 711.

According to such an operation, when an external voltage is being received, the power supply can be switched to the power supply from the charge pump circuit 711 at the time when the charging of the battery 90 proceeds and the battery 90 becomes dischargeable. Accordingly, power can be preferentially supplied from the charge pump circuit 711 with low power consumption, so that power consumption in the charge and discharge control apparatus 10 can be reduced and power consumption of the electronic device 30 can be reduced. As a result, for example, when a battery (an external battery) or the like having a limited discharge amount is used as a power source of the external voltage, the discharge amount of the battery can be suppressed.

Figure 4:
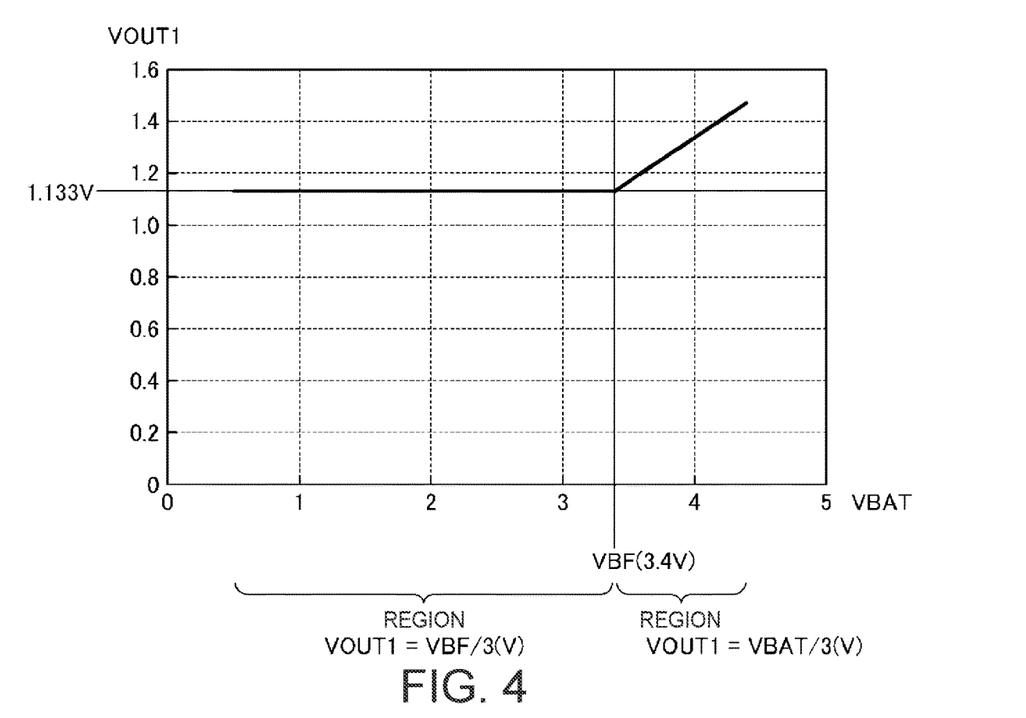
FIG. 4 is a diagram showing an example of the relationship between an output voltage VOUT1 output from a linear regulator and a battery voltage VBAT shown in FIG. 2.

Here, FIG. 4 is a diagram showing an example of the relationship between the output voltage VOUT1 output from the linear regulator 62 and the battery voltage VBAT shown in FIG. 2. FIG. 4 shows a case where the output voltage VOUT1 is continuously output from the linear regulator 62, even when the battery voltage VBAT is the threshold voltage VBF or higher. In FIG. 4, as an example, the threshold voltage VBF is set to 3.4V.

When the battery voltage VBAT of the battery 90 (the charging target 92) is lower than the threshold voltage VBF (predetermined value), that is to say, in the region A1 in FIG. 4, the linear regulator 62 (the first power supply circuit) outputs power at a constant voltage as the output voltage VOUT1. In FIG. 4, in the region A1 where the battery voltage VBAT indicated by the horizontal axis is lower than 3.4V, the output voltage VOUT1 indicated by the vertical axis is kept constant at 1.133V.

On the other hand, when the battery voltage VBAT of the battery 90 is the threshold voltage VBF or higher, that is to say, in the region A2 in FIG. 4, the linear regulator 62 outputs power at a voltage obtained by stepping down the battery voltage VBAT at a predetermined step-down ratio. In the example of FIG. 4, in the region A2 where the battery voltage VBAT indicated by the horizontal axis is 3.4V or higher, the output voltage VOUT1 indicated by the vertical axis substantially monotonically increases in conjunction with the battery voltage VBAT. In the region A2, the linear regulator 62 generates the output voltage VOUT1 corresponding to the battery voltage VBAT. For this reason, in the region A2, when the battery voltage VBAT increases with the progress of charging, the output voltage VOUT1 also increases accordingly.

Here, before and after the threshold voltage VBF, the voltage value is likely to fluctuate due to switching of the supply source. Specifically, as an operation example of the charging system control circuit 63, the output voltage VOUT1 from the linear regulator 62 may be supplied to the processing circuit 100 in the region A1, and the output voltage VOUT2 from the charge pump circuit 711 may be supplied to the processing circuit 100 in the region A2. In this case, in the region A1, the output voltage VOUT1, which is a constant voltage, is preferably set to a voltage value corresponding to the step-down ratio in the charge pump circuit 711. Specifically, when the step-down ratio in the charge pump circuit 711 is one-third, the output voltage VOUT1 is preferably set to one-third of the threshold voltage VBF. By setting such a voltage value, even when the supply source is switched, the voltage value can be prevented from becoming discontinuous, and the fluctuation of the voltage value can be minimized. As a result, the operation of the processing circuit 100 can be prevented from becoming unstable.

In the example of FIG. 4, the output voltage VOUT1 from the linear regulator 62 is maintained at 1.133V, and this voltage value is calculated on the equation 3.4/3=1.133. In this case, the output voltage VOUT1 is preferably set within about ±5%, more preferably within about ±3% of one-third of the threshold voltage VBF.

Also, when the rectified voltage VCC is interrupted at any timing, the supply source may be switched before and after the interruption, as described above. Also in this case, similarly to the above, by optimizing the output voltage VOUT1 in the region A1, it is possible to minimize the fluctuation of the voltage value supplied to the processing circuit 100.

3. Modification of Charge and Discharge Control Apparatus

Next, a charge and discharge control apparatus 10 according to a modification will be described.

Figure 5:
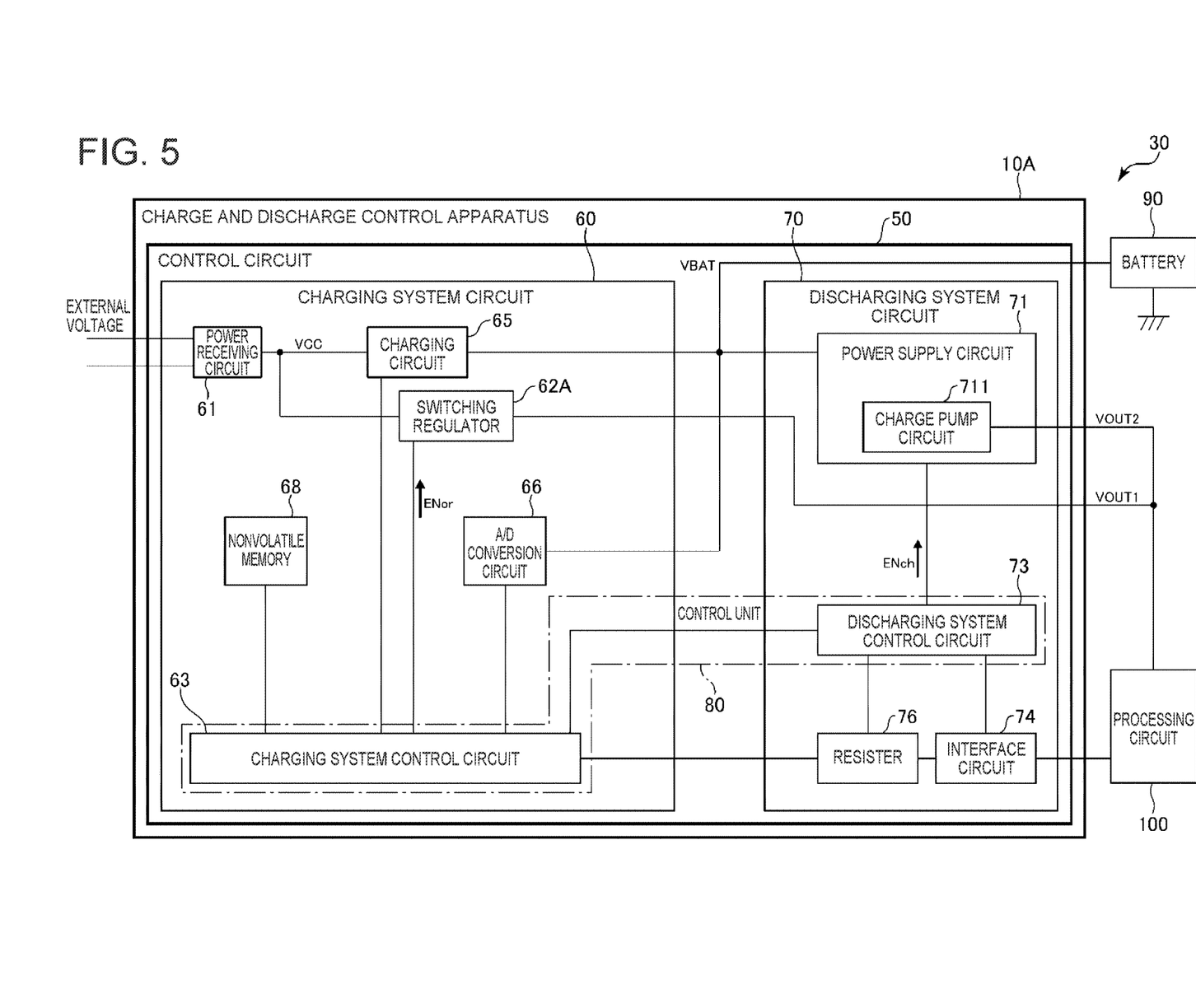
FIG. 5 is a block diagram showing a configuration of a charge and discharge control apparatus according to a modification.

FIG. 5 is a block diagram showing a configuration of the charge and discharge control apparatus according to the modification.

Hereinafter, the charge and discharge control apparatus according to the modification will be described, but in the following description, differences from the charge and discharge control apparatus according to the embodiment will be mainly described, and the description of the same matter will be omitted. In FIG. 5, the same components as those in FIG. 2 are denoted by the same reference numerals.

The charge and discharge control apparatus 10A shown in FIG. 5 is the same as the charge and discharge control apparatus 10 shown in FIG. 2, except that a switching regulator 62A is used instead of the linear regulator 62 shown in FIG. 2. That is to say, the charge and discharge control apparatus 10 shown in FIG. 5 includes the switching regulator 62A as the first power supply circuit.

The switching regulator 62A is realized by, for example, a DC-DC converter. The switching regulator 62A consumes less power than the linear regulator 62. Accordingly, the power consumption of the electronic device 30 can be reduced. For this reason, for example, in a case where a battery (an external battery) or the like having a limited discharge amount is used as a power supply of the rectified voltage VCC, the discharge amount of the battery can be reduced and the battery can be used for a longer period of time.

Also in the above-described modification, the same effects as those of the embodiment can be obtained.

4. Specific Example of Electronic Device

Figure 6:
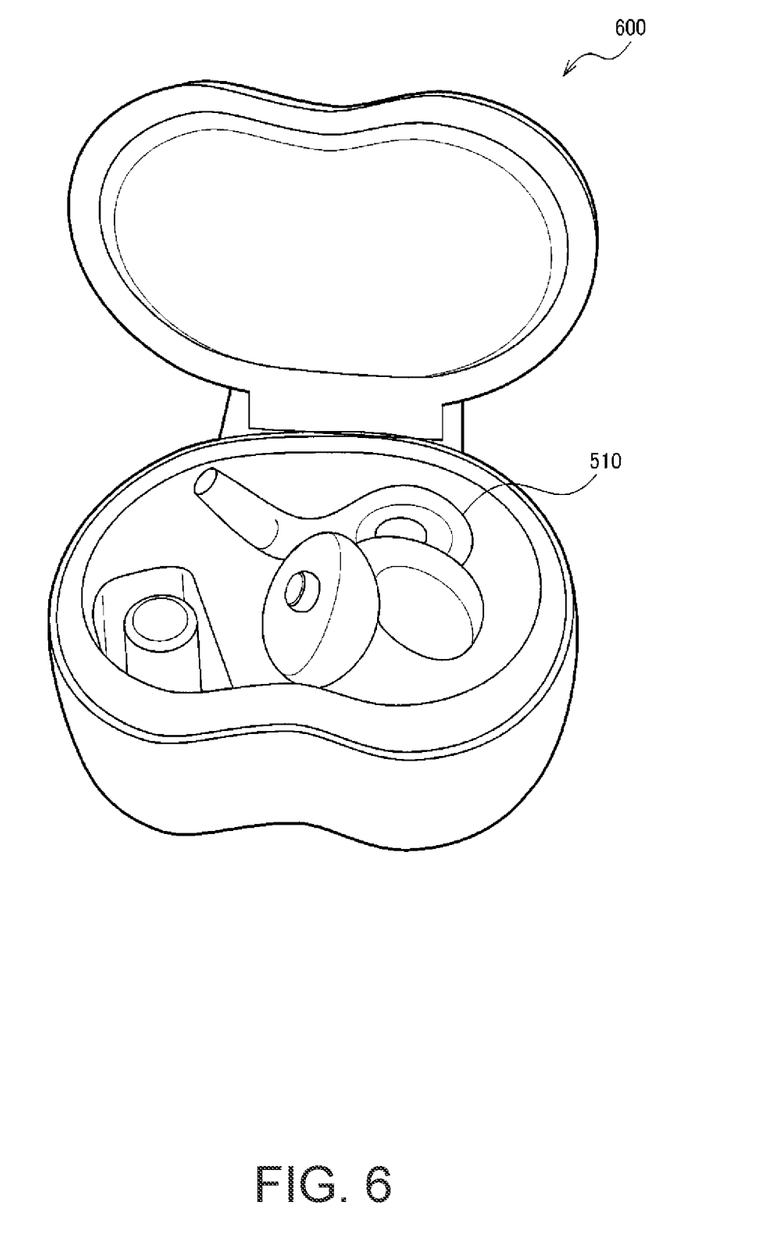
FIG. 6 is a perspective view showing an earphone, which is an example of the electronic device shown in FIG. 1.

FIG. 6 is a perspective view showing an earphone, which is an example of the electronic device shown in FIG. 2.

An earphone 510 shown in FIG. 6 may be, for example, an earphone of a hearing aid or an earphone for audio listening. Although not shown in FIG. 6, the earphone 510 (electronic device) includes the charge and discharge control apparatus 10, the battery 90, and the processing circuit 100 shown in FIG. 2.

The earphone 510 shown in FIG. 6 can be housed in a charging case 600. The earphone 510 may be coupled to the case 600 via a power supply cable or the like (not shown) and may be configured to receive power via the power supply cable, or may also be configured to receive power by contactless power transmission. The case 600 may also have a function of receiving power from the outside, or may also have a primary battery or a secondary battery different from the battery 90. In the latter case, a battery (an external battery) included in the case 600 serves as a power supply of the above-described rectified voltage VCC.

As described above, when receiving the rectified voltage VCC, the charge and discharge control apparatus 10 can supply power to the processing circuit 100 regardless of the state of the battery 90. For this reason, for example, even when the battery 90 is in an over-discharged state, by the earphone 510 being housed in the charging case 600, power can be supplied to the processing circuit 100, and various processes can be executed by the processing circuit 100.

With this configuration, the earphone 510 can be used while charging the earphone 510 regardless of the state of the battery 90, and thus convenience can be improved.

Further, for example, in the case where the earphone 510 has a function of communicating with an external device, the processing circuit 100 can execute communication processing for establishing communication with the external device regardless of the state of the battery 90. As a result, for example, it is possible to cause the processing circuit 100 to execute a notification process of notifying an external device such as a smartphone of information such as a charging status, and it is possible to improve convenience of the earphone 510.

Examples of the electronic device 30 shown in FIG. 2 include various devices such as a head-mounted display, a portable communication terminal such as a smartphone or a mobile phone, a wrist watch, a biological information measurement device, a shaver, an electric toothbrush, a wrist computer, a handy terminal, and an in-vehicle device of an automobile, in addition to a hearable device or a wearable device such as the earphone 510 shown in FIG. 6.

Although the charge and discharge control apparatus and the electronic device of the present disclosure have been described above based on the illustrated embodiment, the present disclosure is not limited thereto. In the charge and discharge control apparatus and the electronic device of the present disclosure, for example, the configuration of each unit of the embodiment may also be replaced with any configuration having the same function, or any configuration may also be added to the embodiment.

What is claimed is:

1. A charge and discharge control apparatus, comprising:
   a first power supply circuit configured to supply power to a power supply target based on received power;
   a charging circuit configured to charge a charging target based on received power;
   a second power supply circuit configured to supply power to the power supply target based on discharge power output from the charging target, wherein the charging target is disposed between the charging circuit and the second power supply circuit; and
   a control unit configured to control operations of the first power supply circuit and the second power supply circuit, wherein when a voltage of the charging target is lower than a predetermined value, the control unit causes the first power supply circuit to supply power to the power supply target,
   wherein when the voltage of the charging target is the predetermined value or higher, the control unit causes the second power supply circuit to supply power to the power supply target.

2. The charge and discharge control apparatus according to claim 1, wherein the second power supply circuit has higher power conversion efficiency than the first power supply circuit.

3. The charge and discharge control apparatus according to claim 1, wherein the first power supply circuit is a switching regulator.

4. The charge and discharge control apparatus according to claim 1, wherein when the voltage of the charging target changes from lower than the predetermined value to the predetermined value or higher, the control unit switches a supply source of power to the power supply target from the first power supply circuit to the second power supply circuit.

5. The charge and discharge control apparatus according to claim 1, wherein when the voltage of the charging target is lower than the predetermined value, the first power supply circuit outputs the power at a constant voltage, and when the voltage of the charging target is the predetermined value or higher, the first power supply circuit outputs, as the power, a voltage obtained by stepping down the voltage of the charging target at a predetermined step-down ratio.

6. An electronic device, comprising the charge and discharge control apparatus according to claim 1.

* * * * *